(12) United States Patent
Lee

(10) Patent No.: US 8,809,434 B2
(45) Date of Patent: Aug. 19, 2014

(54) PROCESS FOR PREPARING ARAMID COPOLYMER

(75) Inventor: Kiu-Seung Lee, Midlothian, VA (US)

(73) Assignee: EI du Pont de Nemours and Company, Wilmington, DE (US)

(*) Notice: Subject to any disclaimer, the term of this patent is extended or adjusted under 35 U.S.C. 154(b) by 224 days.

(21) Appl. No.: 13/559,661

(22) Filed: Jul. 27, 2012

(65) Prior Publication Data

US 2013/0203906 A1 Aug. 8, 2013

Related U.S. Application Data

(60) Provisional application No. 61/513,020, filed on Jul. 29, 2011.

(51) Int. Cl.
| C08G 69/04 | (2006.01) |
| C08G 73/18 | (2006.01) |
| C08G 69/32 | (2006.01) |

(52) U.S. Cl.
CPC ............... *C08G 69/04* (2013.01); *C08G 73/18* (2013.01); *C08G 69/32* (2013.01)
USPC ........... 524/422; 528/310; 528/324; 528/336; 528/338

(58) Field of Classification Search
USPC ................. 524/422; 528/310, 324, 336, 338
See application file for complete search history.

(56) References Cited

U.S. PATENT DOCUMENTS

| 3,063,966 A | 11/1962 | Du Pont |
| 3,227,793 A | 1/1966 | Cipriani |
| 3,414,645 A | 12/1968 | Morgan |
| 3,600,350 A | 8/1971 | Kwolek |
| 3,767,756 A | 10/1973 | Blades |
| 4,018,735 A | 4/1977 | Nakagawa et al. |
| 4,172,938 A | 10/1979 | Mera et al. |
| 5,233,004 A | 8/1993 | Dembek et al. |
| 5,474,842 A | 12/1995 | Hoiness |
| 5,571,891 A | 11/1996 | Jung et al. |
| 5,646,234 A | 7/1997 | Jung et al. |
| 5,667,743 A | 9/1997 | Tai et al. |
| 5,811,042 A | 9/1998 | Hoiness |
| 2003/0064316 A1 | 4/2003 | Zebala |
| 2010/0029159 A1 | 2/2010 | Ishihara |
| 2011/0046340 A1 | 2/2011 | DeVos et al. |

FOREIGN PATENT DOCUMENTS

| CN | 101165078 | 4/2008 |
| CN | 101787582 | 7/2010 |
| RU | 2017866 | 8/1994 |
| RU | 2045586 | 10/1995 |
| RU | 2285071 | * 10/2006 |
| RU | 2285760 | 10/2006 |
| RU | 2285761 | 10/2006 |
| RU | 2283307 | * 9/2007 |
| WO | WO2005/054337 | 6/2005 |
| WO | WO2005054337 | 6/2005 |
| WO | WO2008105547 | 9/2008 |

OTHER PUBLICATIONS

U.S. Appl. No. 13/559,698, Jul. 27, 2012, DuPont.
U.S. Appl. No. 13/559,696, Jul. 27, 2012, DuPont.
U.S. Appl. No. 13/559,691, Jul. 27, 2012, DuPont.
U.S. Appl. No. 13/559,678, Jul. 27, 2012, DuPont.
U.S. Appl. No. 13/559,684, Jul. 27, 2012, DuPont.
U.S. Appl. No. 13/559,681, Jul. 27, 2012, DuPont.
U.S. Appl. No. 13/559,674, Jul. 27, 2012, DuPont.
U.S. Appl. No. 13/559,669, Jul. 27, 2012, DuPont.
U.S. Appl. No. 13/559,667, Jul. 27, 2012, DuPont.
U.S. Appl. No. 13/559,659, Jul. 27, 2012, DuPont.
U.S. Appl. No. 13/559,657, Jul. 27, 2012, DuPont.
U.S. Appl. No. 13/559,655, Jul. 27, 2012, DuPont.
PCT International Search Report and Written opinion for International Application No. PCT/US2012/048428 Dated Oct. 15, 2012.
PCT International Search Report and Written opinion for International Application No. PCT/US2012/048429 Dated Sep. 28, 2012.
PCT International Search Report and Written opinion for International Application No. PCT/US2012/048448 Dated Sep. 27, 2012.
PCT International Search Report and Written opinion for International Application No. PCT/US2012/048431 Dated Jul. 2, 2013.
PCT International Search Report and Written opinion for International Application No. PCT/US2012/048434 Dated Sep. 28, 2012.
PCT International Search Report and Written opinion for International Application No. PCT/US2012/048435 Dated Sep. 27, 2012.
PCT International Search Report and Written opinion for International Application No. PCT/US2012/048438 Dated Sep. 28, 2012.
PCT International Search Report and Written opinion for International Application No. PCT/US2012/048439 Dated Sep. 27, 2012.
PCT International Search Report and Written opinion for International Application No. PCT/US2012/048442 Dated Sep. 28, 2012.
PCT International Search Report and Written opinion for International Application No. PCT/US2012/048441 Dated Sep. 28, 2012.
PCT international Search Report and Written opinion for International Application No. PCT/US2012/048444 Dated Sep. 27, 2012.
PCT International Search Report and Written opinion for International Application No. PCT/US2012/048484 Dated Sep. 28, 2012.

* cited by examiner

*Primary Examiner* — Gregory Listvoyb

(57) ABSTRACT

The invention concerns processes for forming a polymer comprising residues of terephthaloyl chloride, paraphenylene diamine, and a salt of formula I

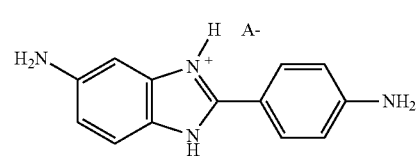

wherein $A^-$ is a halogen anion, $HSO_4^-$, $OH^-$, $NO_3^-$, $C_2H_3O_2^-$, or $H_2PO_4^-$; the process comprising the steps of: a) forming a mixture comprising salt of formula I and paraphenylene diamine in a solvent system comprising an organic solvent and an inorganic salt; and b) adding terephthaloyl chloride to the mixture and allowing the formation of the polymer.

19 Claims, No Drawings

PROCESS FOR PREPARING ARAMID COPOLYMER

TECHNICAL FIELD

The present application concerns methods of producing aramid copolymers derived from 5(6)-amino-2-(p-aminophenyl)benzimidazole (DAPBI), para-phenylenediamine (PPD) and terephthaloyl dichloride (TCl) that are capable of forming fibers having superior physical properties.

BACKGROUND

Fibers derived from 5(6)-amino-2-(p-aminophenyl)benzimidazole (DAPBI), para-phenylenediamine (PPD) and terephthaloyl dichloride (TCl or T, also commonly referred to as terephthaloyl chloride) are known in the art. Such copolymers are the basis for a high strength fibers manufactured in Russia, for example, under the trade names Armos® and Rusar®. See, Russian Patent Application No. 2,045,586.

One disadvantage to the use of copolymers having DAPBI as comonomer is that DAPBI is an expensive monomer. One major contributor to the high cost is the formation and purification of the free-base from the intermediate salts, such as sulfuric acid or hydrochloric acid, depending in the chemistry of the synthesis used.

SUMMARY

In some aspects, the invention concerns processes for forming a polymer comprising residues of terephthaloyl chloride, paraphenylene diamine, and a salt of formula I

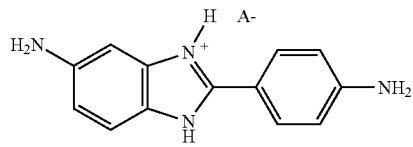

I wherein $A^-$ is a halogen anion, $HSO_4^-$, $OH^-$, $NO_3^-$, $C_2H_3O_2^-$, or $H_2PO_4^-$; the process comprising the steps of: a) forming a mixture comprising salt of formula I and paraphenylene diamine in a solvent system comprising an organic solvent and an inorganic salt; and b) adding terephthaloyl chloride to the mixture and allowing the formation of the polymer. In some embodiments, the salt of formula I is of the formula

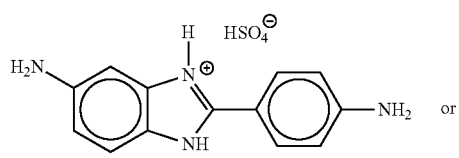

II

III

In some preferred embodiments, a stoichiometric amount of terephthaloyl chloride is added to the mixture. For some processes, the terephthaloyl chloride is added in two or more steps. In some embodiments, step b) comprises adding 20-50% of the terephthaloyl chloride in a first addition step to form a second mixture, stirring the second mixture for at least 1 minute, and adding the remaining terephthaloyl chloride in one or more addition steps to the stirred second mixture. In certain embodiments, step b) is performed at a temperature between −10 and 30° C.

In some embodiments, the organic solvent is N-methyl-2-pyrrolidone (NMP) or dimethylacetamide (DMAC). Suitable inorganic salts include LiCl and $CaCl_2$. In one preferred embodiment, the solvent system is NMP/$CaCl_2$. In certain embodiments, the NMP/$CaCl_2$ solvent has a $CaCl_2$ weight percent in the range of from 1 to 10%.

In some embodiments of the invention, the molar ratio of the salt of formula I to paraphenylene diamine is in the range of from 0.5 to 4.0.

DETAILED DESCRIPTION OF ILLUSTRATIVE EMBODIMENTS

The present invention can be understood more readily by reference to the following detailed description taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

The DAPBI/PPD-T copolymers are prepared using intermediate acid salts of DAPBI (for example, those depicted in the following structures, where A is a conjugate base of an acid) instead of purified DAPBI monomer. Such copolymers have useful inherent viscosities of at least 4 dl/g or greater with a preferred range of 4 to 7 dl/g. These intermediate acid salts have better solubility in the polymerization medium. In structure I, A- can be any counter-ion that does not interfere with monomer stability or the polymerization reaction. In some embodiments, $A^-$ is a halogen anion, $HSO_4^-$, $OH^{31}$, $NO_3^-$, $C_2H_3O_2^-$, or $H_2PO_4$.

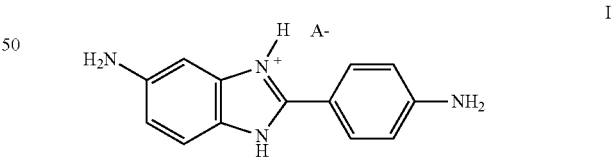

I

Salts of structure I can be made by processes known in the art. U.S. Pat. No. 4,417,056, for example, teaches the production of such compounds by the cycloreduction of N-(4-nitrobenzoyl)2,4-dinitroaniline utilizing hydrogen gas in the presence of a catalyst based on a metal belonging to Group VIII of the Periodic Table. This reaction would be undertaken in the presence of an aqueous solution of acid.

Two examples of intermediate acid salts of DAPBI include the sulfuric acid and hydrochloric acid salts depicted in structures II and III. Other salts can be produced by use of other acids in the production process.

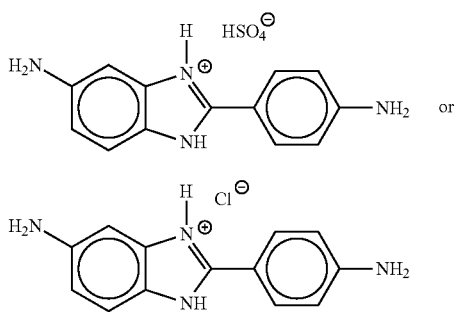

In some embodiments, the organic solvent is N-methyl-2-pyrrolidone (NMP) or dimethylacetamide (DMAC). Suitable inorganic salts include LiCl and CaCl$_2$. In one preferred embodiment, the solvent system is NMP/CaCl$_2$. In certain embodiments, the NMP/CaCl$_2$ solvent has a CaCl$_2$ weight percent in the range of from 1 to 10%. It should be noted that the solubility of CaCl$_2$ in NMP is about 8%. As such when more than 8% CaCl$_2$ is used, some undissolved CaCl$_2$ is present in the solvent system. The solvents and salts can be obtained from commercial sources and, if desired, purified by methods known to those skilled in the art.

In some processes, the molar ratio of DAPBI (salt of structure I) to phenylene diamine is in the range of from 0.25 to 4.0. This ratio is equivalent to a DAPBI/PPD ratio of 20/80 to 80/20. In certain processes, the amount of the slurry that is DAPBI in step (a) is in the range of from 0.5 to 10 weight %.

In some embodiments, one or more process steps can be performed under agitation. The polymer can be isolated in some embodiments. The isolated polymer can be comminuted a desired particle size to assist in processing and storage. The polymer can be treated with one or more washing steps, neutralizing steps, or both. These washing and/or neutralizing steps can be performed before or after comminuting the polymer. Equipment suitable for use in agitation of the reaction mixtures, washing and neutralization steps, and for comminuting the polymer is known to those skilled in the art.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh}=\ln(V_{rel})/C,$$

where ln is the natural logarithm function and C is the concentration of the polymer solution. $V_{rel}$ is a unitless ratio, thus $V_{inh}$ is expressed in units of inverse concentration, typically as deciliters per gram ("dl/g").

Neutralization of the polymer can occur in one or more steps by contacting the polymer with a base. Suitable bases include NaOH; KOH; Na$_2$CO$_3$; NaHCO$_3$; NH$_4$OH; Ca(OH)$_2$; K$_2$CO$_3$; KHCO$_3$; or trialkylamines, preferably tributylamine; other amines; or mixtures thereof. In one embodiment, the base is water soluble. In some preferred examples the neutralization solution is an aqueous solution of base.

The polymer can also be washed with water independent of or prior to and/or after the neutralization step.

In some aspects, the invention additionally concerns the step of dissolving the polymer in a solvent comprising sulfuric acid to form a solution suitable for spinning fibers (also referred to as a "spin dope"). The polymer to be dissolved includes the isolated polymer that may or may not have been washed and/or neutralized and polymer may or may not have been comminuted. The dissolved polymer can be spun into fibers by conventional techniques known to those skilled in the art.

The spin dope containing the copolymer described herein can be spun into dope filaments using any number of processes; however, wet spinning and "air-gap" spinning are the best known. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers. In "air-gap" spinning the spinneret typically extrudes the fiber first into a gas, such as air and is a preferred method for forming filaments As used herein, the terms filaments and fibers are used interchangeably.

The fiber can be contacted with one or more washing baths or cabinets. Washes can be accomplished by immersing the fiber into a bath or by spraying the fiber with the aqueous solution. Washing cabinets typically comprise an enclosed cabinet containing one or more rolls that the yarn travels around a number of times, and across, prior to exiting the cabinet. As the yarn travels around the roll, it is sprayed with a washing fluid. The washing fluid is continuously collected in the bottom of the cabinet and drained therefrom.

The temperature of the washing fluid(s) is preferably greater than 30° C. The washing fluid can also be applied in vapor form (steam), but is more conveniently used in liquid form. Preferably, a number of washing baths or cabinets are used. The residence time of the yarn in any one washing bath or cabinet will depend on the desired concentration of residual sulfur in the yarn. In a continuous process, the duration of the entire washing process in the preferred multiple washing bath(s) and/or cabinet(s) is preferably no greater than about 10 minutes, more preferably greater than about 5 seconds. In some embodiments the duration of the entire washing process is 20 seconds or more; in some embodiments the entire washing is accomplished in 400 seconds or less. In a batch process, the duration of the entire washing process can be on the order of hours, as much as 12 to 24 hours or more.

If needed, the neutralization of the acid (such as sulfuric acid solvent) in the yarn can occur in a bath or cabinet. In some embodiments, the neutralization bath or cabinet can follow one or more washing baths or cabinets. Washes can be accomplished by immersing the fiber into a bath or by spraying the fiber with the aqueous solution. Neutralization can occur in one bath or cabinet or in multiple baths or cabinets. In some embodiments, preferred bases for the neutralization of sulfuric acid impurity include NaOH; KOH; Na$_2$CO$_3$; NaHCO$_3$; NH$_4$OH; Ca(OH)$_2$; K$_2$CO$_3$; KHCO$_3$; or trialkylamines, preferably tributylamine; other amines; or mixtures thereof. In one embodiment, the base is water soluble. In some preferred examples the neutralization solution is an aqueous solution containing 0.01 to 1.25 mols of base per liter, preferably 0.01 to 0.5 mols of base per liter. The amount of cation is also dependent on the time and temperature of exposure to the base and the washing method. In some preferred embodiments, the base is NaOH or Ca(OH)$_2$.

After treating the fiber with base, the process optionally can include the step of contacting the yarn with a washing solution containing water or an acid to remove all or substantially all excess base. This washing solution can be applied in one or more washing baths or cabinets.

After washing and neutralization, the fiber or yarn can be dried in a dryer to remove water and other liquids. One or more dryers can be used. In certain embodiments, the dryer can be an oven that uses heated air to dry the fibers. In other embodiments, heated rolls can be used to heat the fibers. The fiber is heated in the dryer to a temperature of at least about 20° C. but less than about 100° C. until the moisture content of the fiber is 20 weight percent of the fiber or less. In some embodiments the fiber is heated to 85° C. or less. In some embodiments the fiber is heated under those conditions until the moisture content of the fiber is 14 weight percent of the fiber or less. The inventors have discovered that low temperature drying is a preferred route to improved fiber strength. Specifically, the inventors have found that the best fiber strength properties are achieved when the first drying step (i.e. heated roll, heated atmosphere as in an oven, etc.) experienced by the never-dried yarn is conducted at gentle temperatures not normally used in continuous processes used to dry high strength fibers on commercial scale. It is believed that the copolymer fiber has more affinity to water than PPD-T homopolymer; this affinity slows the diffusion rate of water out of the polymer during drying and consequently if the never-dried yarn is directly exposed to typical high drying temperatures, generally used to create a large thermal driving force and reduce drying time, irreparable damage to the fiber occurs resulting in lower fiber strength. In some embodiments, the fiber is heated at least to about 30° C.; in some embodiments the fiber is heated at least to about 40° C.

The dryer residence time is less than ten minutes and is preferably less than 180 seconds. The dryer can be provided with a nitrogen or other non-reactive atmosphere. The drying step typically is performed at atmospheric pressure. If desired, however, the step can be performed under reduced pressure. In one embodiment, the filaments are dried under a tension of at least 0.1 gpd, preferably a tension of 2 gpd or greater.

DEFINITIONS

As used herein, the term "residue" of a chemical species refers to the moiety that is the resulting product of the chemical species in a particular reaction scheme or subsequent formulation or chemical product, regardless of whether the moiety is actually obtained from the chemical species. Thus, a copolymer comprising residues of paraphenylene diamine refers to a copolymer having one or more units of the formula:

Similarly, a copolymer comprising residues of DAPBI or DAPBI salt contains one or more units of the structure:

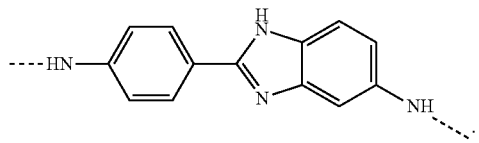

A copolymer having residues of terephthalic dichloride contains one or more units of the formula:

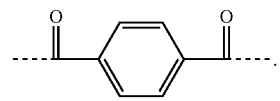

The term "polymer," as used herein, means a polymeric compound prepared by polymerizing monomers, whether of the same or a different type. The term "copolymer" (which refers to polymers prepared from two different monomers), the term "terpolymer" (which refers to polymers prepared from three different types of monomers), and the term "quadpolymer (which refers to polymers having four different types of monomers) are included in the definition of polymer.

The term "powder" when referring to polymer means particles of the copolymer having neither fibrous qualities like fiber or pulp, nor fibrous film-like qualities like fibrids. Individual particles tend to be fibril-free, have a random shape, and an effective particle diameter of 840 micrometers or less. U.S. Pat. Nos. 5,474,842 and 5,811,042 are illustrative.

As used herein, "stoichiometric amount" means the amount of a component theoretically needed to react with all of the reactive groups of a second component. For example, "stoichiometric amount" refers to the moles of terephthalic dichloride needed to react with substantially all of the amine groups of the amine component (paraphenylene diamine and DAPBI salt). It is understood by those skilled in the art that the term "stoichiometric amount" refers to a range of amounts that are typically within 10% of the theoretical amount. For example, the stoichiometric amount of terephthalic dichloride used in a polymerization reaction can be 90-110% of the amount of terephthalic acid theoretically needed to react with all of the paraphenylene diamine and DPABI amine salt groups.

The "fiber" refers to a relatively flexible, macroscopically homogeneous body having a high ratio of length to width across its cross-sectional area perpendicular to its length. In preferred embodiments, the fiber is upon inspection essentially solid in cross-section, having few random voids or open areas that would be considered defects in the fibers.

The term "organic solvent" is understood herein to include a single component organic solvent or a mixture of two or more organic solvents. In some embodiments, the organic solvent is dimethylformaaide, dimethylacetamide (DMAC), N-methyl-2-pyrrolidone (NMP), or dimethylsulfoxide. In some preferred embodiments, the organic solvent is N-methyl-2-pyrrolidone or dimethylacetamide.

The term "inorganic salt" refers to a single inorganic salt or to a mixture of two or more inorganic salts. In some embodiments, the inorganic salt is sufficiently soluble in the solvent and liberates an ion of a halogen atom having an atomic number in the solvent. In some embodiments, the preferred inorganic salt is KCl, $ZnCl_2$, LiCl or $CaCl_2$. In certain preferred embodiments, the inorganic salt is LiCl or $CaCl_2$.

By "never-dried" it is meant the moisture content of the fiber is at least 75 weight percent of the fiber.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

Test Methods

Inherent viscosity can be determined using a solution in which a polymer is dissolved in a concentrated sulfuric acid with a concentration of 96 wt % at a polymer concentration (C) of 0.5 g/dl and at a temperature of 25° C. Inherent viscosity is then calculated as ln $(t_{poly}/t_{solv})/C$ where $t_{poly}$ is the drop time for the polymer solution and $t_{solv}$ is the drop time of the pure solvent.

The invention is illustrated by the following examples, which are not intended to be limiting in nature.

EXAMPLES

NMP, DMAC, LiCl, CaCl$_2$, DAPBI, PPD and TCl were obtained from commercial sources. DAPBI sulfuric acid salt was prepared in the lab by methods known to those skilled in the art.

Example 1

To 1 liter reaction kettle equipped with basket stirrer, nitrogen inlet/outlet, 83.709 grams of NMP/CaCl$_2$ premix (8.3 wt % (weight of salt/total weight of salt plus solvent)), 109.620 grams of NMP (N-methyl-2-pyrrolidone), 14.123 grams (0.044 moles) of DAPBI sulfuric acid salt, and 2.031 grams (0.019 moles) of PPD (p-phenylene diamine) were added and stirred for 30 minutes at room temperature. The content was stirred in ice-water bath to cool the mixture below 10° C. 4.459 grams (0.022 moles) of TCl (terephthaloyl chloride) was added all at once and stirred for 5 minutes. At this point solution became clear as DAPBI reacted with TCl. The ice water bath was removed. 8.281 grams (0.041 moles) of TCl was then added all at once and stirred. The solution became very viscous and gelled in about 7 minutes and finally crumbed in about 10 minutes The resulting crumb was subjected to high speed stirring for another 20 minutes.

The resulting polymer was transferred to Waring® Blender and ground to small particles and washed several times to remove the solvent (NMP/CaCl$_2$) and H$_2$SO$_4$ and HCl generated by the reaction. Then the polymer was neutralized with sodium bicarbonate and finally washed with water a few times to get neutral polymer. The polymer was transferred into a tray and dried at 120° C. overnight in a vacuum oven with nitrogen sweep. The polymer inherent viscosity was 4.34 dl/g as measured by dissolving in sulfuric acid per the test method.

Example 2

The polymer of Example 1 is combined with a solvent comprising sulfuric acid. The combination is agitated, while cooling if needed to control temperature, until the polymer is fully dissolved in the solvent and a solution suitable for spinning fibers is formed.

What is claimed:

1. A process for forming a polymer comprising residues of terephthaloyl chloride, paraphenylene diamine, and a salt of formula I

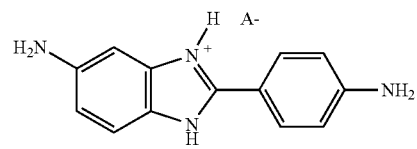

wherein A$^-$ is a halogen anion, HSO$_4^-$, OH$^-$, NO$_3^-$, C$_2$H$_3$O$_2^-$, or H$_2$PO$_4^-$;

said process comprising the steps of:
a) forming a mixture comprising salt of formula I and paraphenylene diamine in a solvent system comprising an organic solvent and an inorganic salt;
b) adding terephthaloyl chloride to the mixture and allowing the formation of said polymer.

2. The process of claim 1, wherein a stoichiometric amount of terephthaloyl chloride is added to the mixture.

3. The process of claim 1, wherein the organic solvent is N-methyl-2-pyrrolidone (NMP) or dimethylacetamide (DMAC).

4. The process of claim 1, wherein the inorganic salt is LiCl or CaCl$_2$.

5. The process of claim 1, wherein the solvent system is NMP/CaCl$_2$.

6. The process of claim 1, wherein the salt of formula I is of the formula

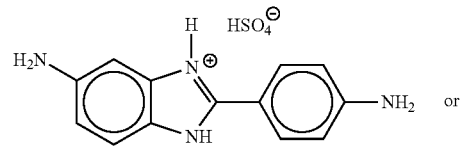

or

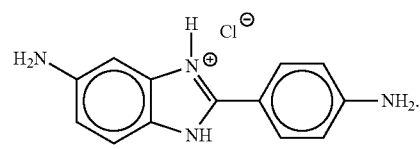

7. The process of claim 2, wherein said terephthaloyl chloride is added in two or more steps.

8. The process of claim 7, wherein step b) comprises:
adding 20-50% of the terephthaloyl chloride in a first addition step to form a second mixture,
stirring the second mixture for at least 1 minute, and
adding the remaining terephthaloyl chloride in one or more addition steps to the stirred second mixture.

9. The process of claim 1, wherein step b) is performed at a temperature between −10 and 30° C.

10. The process of claim 1, wherein the salt of formula I and paraphenylene diamine are present in a molar ratio in the range of from 0.5 to 4.0.

11. The process of claim 5, wherein NMP/CaCl$_2$ has a CaCl$_2$ weight percent in the range of from 1.0 to 10%.

12. The process of claim 1, further comprising isolating said polymer.

13. The process of claim 12, further comprising the step of comminuting the polymer.

14. The process of claim 12, further comprising treating the polymer with one or more washing steps, neutralizing steps, or both.

15. The process of claim 13, further comprising treating the comminuted polymer with one or more washing steps, neutralizing steps, or both.

16. The process of claim 14, further comprising the step of dissolving the polymer in a solvent comprising sulfuric acid to form a solution suitable for spinning fibers.

17. The process of claim 15, further comprising the step of dissolving the polymer in a solvent comprising sulfuric acid to form a solution suitable for spinning fibers.

18. The process of claim 14, further comprising the step of dissolving the polymer in a solvent comprising N-methyl-2-pyrrolidone (NMP) or dimethylacetamide (DMAC) and an inorganic salt to form a solution suitable for spinning fibers.

19. The process of claim 15, further comprising the step of dissolving the polymer in a solvent comprising N-methyl-2-pyrrolidone (NMP) or dimethylacetamide (DMAC) and an inorganic salt to form a solution suitable for spinning fibers.

* * * * *